(12) United States Patent
Dueweke et al.

(10) Patent No.: US 11,874,183 B2
(45) Date of Patent: Jan. 16, 2024

(54) SYSTEMS AND METHODS FOR CONTINUOUS MODE FORCE TESTING

(71) Applicant: NEXTINPUT, INC., Mountain View, CA (US)

(72) Inventors: Michael Dueweke, Campbell, CA (US); Allan Liu, HsinChu (TW); Dan Benjamin, Atlanta, GA (US)

(73) Assignee: NextInput, Inc., Mountain View, CA (US)

( * ) Notice: Subject to any disclaimer, the term of this patent is extended or adjusted under 35 U.S.C. 154(b) by 113 days.

(21) Appl. No.: 17/615,208

(22) PCT Filed: Jun. 1, 2020

(86) PCT No.: PCT/US2020/035531
§ 371 (c)(1),
(2) Date: Nov. 30, 2021

(87) PCT Pub. No.: WO2020/243696
PCT Pub. Date: Dec. 3, 2020

(65) Prior Publication Data
US 2022/0228936 A1    Jul. 21, 2022

Related U.S. Application Data

(60) Provisional application No. 62/854,422, filed on May 30, 2019.

(51) Int. Cl.
*G01L 5/00* (2006.01)
(52) U.S. Cl.
CPC .................... *G01L 5/0028* (2013.01)

(58) Field of Classification Search
CPC ...... G01L 5/0028; G01L 5/0038; G01L 25/00
See application file for complete search history.

(56) References Cited

U.S. PATENT DOCUMENTS 4,140,008 A * 2/1979 Golembeck .............. G01N 3/42
                                                      73/806
5,255,562 A * 10/1993 Yamamoto ............... G01N 3/24
                                                      73/78
(Continued)

FOREIGN PATENT DOCUMENTS

CN        103575460 B      3/2016
CN        107255544 A      10/2017
(Continued)

OTHER PUBLICATIONS

PCT Application No. PCT/US2020/035531, International Search Report and Written Opinion, dated Aug. 20, 2020, 9 pgs.
(Continued)

*Primary Examiner* — Freddie Kirkland, III
(74) *Attorney, Agent, or Firm* — Withrow & Terranova, P.L.L.C.

(57) ABSTRACT

Described herein is a method and system for testing a force or strain sensor in a continuous fashion. The method employs a sensor, a test fixture, a load cell, a mechanical actuator and tester hardware and software to simultaneously record signal outputs from the sensor and load cell as functions of time. The method provides time synchronization events for recording data streams between, for example, a linear ramp of the force on, or displacement of, the sensor and for extracting performance characteristics from the data in post-test processing.

31 Claims, 11 Drawing Sheets

(56) References Cited

U.S. PATENT DOCUMENTS

| | | | |
|---|---|---|---|
| 5,447,051 A | 9/1995 | Hanks et al. | |
| 5,517,860 A * | 5/1996 | Lin | G01N 3/20 |
| | | | 73/789 |
| 6,176,117 B1 * | 1/2001 | Chen | G01L 25/00 |
| | | | 73/1.15 |
| 6,520,004 B1 * | 2/2003 | Lin | G01N 3/46 |
| | | | 73/81 |
| 7,395,722 B2 * | 7/2008 | Lin | G01L 25/00 |
| | | | 73/789 |
| 7,681,432 B2 * | 3/2010 | Hay | G01B 3/008 |
| | | | 73/1.79 |
| 8,839,655 B2 * | 9/2014 | Bormann | G01L 25/00 |
| | | | 73/1.15 |
| 9,487,388 B2 | 11/2016 | Brosh | |
| 9,493,342 B2 | 11/2016 | Brosh et al. | |
| 9,696,229 B2 * | 7/2017 | Schulz | G01L 25/00 |
| 9,880,066 B2 | 1/2018 | Larsen et al. | |
| 9,902,611 B2 | 2/2018 | Brosh et al. | |
| 10,466,119 B2 | 11/2019 | Campbell et al. | |
| 10,921,217 B2 * | 2/2021 | Ehmke | G01M 17/10 |
| 11,118,994 B2 * | 9/2021 | Tao | G01G 5/006 |
| 11,506,559 B2 * | 11/2022 | Chen | G01L 25/00 |
| 11,624,648 B2 * | 4/2023 | Ohler | G01G 23/012 |
| | | | 177/50 |
| 2007/0186670 A1 * | 8/2007 | Lin | G01L 25/00 |
| | | | 73/789 |
| 2010/0281944 A1 | 11/2010 | Brucke | |
| 2011/0024192 A1 | 2/2011 | Pastusek et al. | |
| 2015/0096348 A1 * | 4/2015 | Schulz | G01L 25/00 |
| | | | 73/1.08 |
| 2016/0273990 A1 * | 9/2016 | Larsen | G01L 25/00 |
| 2016/0363490 A1 | 12/2016 | Campbell et al. | |
| 2018/0238771 A1 * | 8/2018 | Ehmke | B61K 9/08 |
| 2019/0383675 A1 | 12/2019 | Tsai et al. | |
| 2019/0383676 A1 | 12/2019 | Foughi et al. | |
| 2020/0191622 A1 * | 6/2020 | Suga | G01L 27/007 |

FOREIGN PATENT DOCUMENTS

| | | |
|---|---|---|
| CN | 109000847 A | 12/2018 |
| WO | 2018148503 A1 | 8/2018 |
| WO | 2018148510 A1 | 8/2018 |
| WO | 2019068686 A1 | 4/2019 |

OTHER PUBLICATIONS

Extended European Search Report for European Patent Application No. 20812780.3, dated Apr. 12, 2023, 9 pages.

* cited by examiner

SYSTEMS AND METHODS FOR CONTINUOUS MODE FORCE TESTING

CROSS REFERENCE TO RELATED APPLICATIONS

This application claims the benefit of U.S. provisional patent application No. 62/854,422, filed on May 30, 2019, and entitled "CONTINUOUS MODE FORCE TESTING," the disclosure of which is expressly incorporated herein by reference in its entirety.

FIELD OF TECHNOLOGY

The present disclosure relates to the testing of force sensors and strain gauges used for converting force or strain into an electrical signal.

BACKGROUND

When testing sensors such as force sensors and strain gauges, it is often required to evaluate sensor response over a range of input values in order to assess performance to specifications. Current techniques for testing require a range of force or strain values to be applied and to stabilize each force or strain mechanically and wait for electrical signal variations to stabilize prior to taking each measurement. The repeated process of applying a force or strain, waiting for mechanical and electrical stabilization, taking a measurement of both force or strain and electrical signal, and applying an additional force or strain value is time consuming and costly.

Accordingly, there is a need in the pertinent art for a less time consuming, lower-cost, test method for force sensors and strain gauges.

SUMMARY

The present disclosure pertains to a method of testing force sensors and strain gauges comprising the application of a mechanical force or strain and measurement of a sensor electrical output. Each force or strain sensor can include a flexure and one or more piezoresistive strain gauges. In one implementation, a mechanical force is applied with a linear ramping of the applied force while simultaneously measuring the electrical output of the force sensor and the amount of force applied. Synchronizing events are introduced in the test sequence to allow for post-processing and analysis of the data taken through various measurement channels. The method enables faster, lower-cost, and more accurate measurements of force sensors and strain gauges.

An example testing system is described herein. The system includes a test fixture configured to provide electrical connection to a force or strain sensor, a mechanical actuator configured to apply force to the force or strain sensor, a load cell configured to measure an amount of the force applied to the force or strain sensor and a controller configured to operate the mechanical actuator and simultaneously record respective output signals from the force or strain sensor and the load cell.

In some implementations, the step of simultaneously recording respective output signals from the force or strain sensor and the load cell optionally includes sampling the respective output signals in a burst mode, where the burst mode is defined by a sampling frequency and a sampling period.

In some implementations, the respective output signal from the force or strain sensor is sampled with a first sampling frequency and a first sampling period. Additionally, the respective output signal from the load cell is optionally sampled with a second sampling frequency and a second sampling period. Optionally, the first and second sampling frequencies are the same or different.

Alternatively or additionally, the force or strain sensor includes one or more piezoresistive, piezoelectric, or capacitive transducers.

Alternatively or additionally, the system further optionally includes a robotic arm, where the mechanical actuator is optionally controlled by the robotic arm. For example, the robotic arm is operably connected to and controlled by the controller.

Alternatively or additionally, the respective output signals from the force or strain sensor and the load cell is stored in memory of the controller.

Alternatively or additionally, the respective output signals from the force or strain sensor and the load cell is recorded as a function of time. In some implementations the controller is configured to operate the mechanical actuator to change the amount of the force applied by the mechanical actuator from a first force value to a second force value, where the first and second force values are different. Optionally, the controller is further configured to operate the mechanical actuator to hold the first force value constant while recording the respective output signals from the force or strain sensor and the load cell as a function of time, subsequently ramp the first force value to the second force value while recording the respective output signals from the force or strain sensor and the load cell as a function of time, and hold the second force value constant while recording the respective output signals from the force or strain sensor and the load cell as a function of time. In some implementations, the controller is further configured to operate the mechanical actuator to use a transition from the first force value to the ramped force and a transition from the ramped force to the second force value as temporal data synchronization points between the respective output signals from the force or strain sensor and the load cell.

Alternatively or additionally, the system can optionally include a flexible substrate can be included, where the force or strain sensor is soldered to the flexible substrate, and the force is applied to the flexible substrate by the mechanical actuator to create displacement and strain within the flexible substrate and strain within the force or strain sensor. In some implementations, the respective output signal of the force or strain sensor is recorded by the controller through electrical routing within the flexible substrate.

In some implementations, the system optionally includes the force or strain sensor.

An example method for testing a force or strain sensor is also described herein. The example method includes providing a test fixture configured to provide electrical connection to the force or strain sensor, connecting the force or strain sensor to the test fixture, and operating a mechanical actuator to apply a force to the force or strain sensor. The example method also includes providing a load cell configured to measure an amount of the force applied to the force or strain sensor, and simultaneously recording respective output signals from the force or strain sensor and the load cell.

Additionally, the step of simultaneously recording respective output signals from the force or strain sensor and the load cell includes sampling the respective output signals in a burst mode, where the burst mode is defined by a sampling frequency and a sampling period.

In some implementations, the respective output signal from the force or strain sensor is sampled with a first sampling frequency and a first sampling period. Additionally, the respective output signal from the load cell is sampled with a second sampling frequency and a second sampling period. Optionally, the first and second sampling frequencies are the same or different.

Alternatively or additionally, the force or strain sensor detects strain through piezoresistive, piezoelectric, or capacitive transducers.

Alternatively or additionally, the mechanical actuator is optionally controlled by a robotic arm. For example, the robotic arm is operably connected to and controlled by a computing device.

Alternatively or additionally, the respective output signals from the force or strain sensor and the load cell are optionally stored in memory of a computing device.

Alternatively or additionally, the respective output signals from the force or strain sensor and the load cell is optionally recorded as a function of time.

Alternatively or additionally, the method further includes changing the amount of the force applied by the mechanical actuator from a first force value to a second force value, where the first and second force values are different. In some implementations, the method further includes holding the first force value constant while recording the respective output signals from the force or strain sensor and the load cell as a function of time, subsequently ramping the first force value to the second force value while recording the respective output signals from the force or strain sensor and the load cell as a function of time, and subsequently holding the second force value constant while recording the respective output signals from the force or strain sensor and the load cell as a function of time. Optionally, the method further includes using a transition from the first force value to the ramped force and a transition from the ramped force to the second force value as temporal data synchronization points between the respective output signals from the force or strain sensor and the load cell.

Alternatively or additionally, the force or strain sensor is soldered to a flexible substrate, and the force is applied to the flexible substrate by the mechanical actuator to create displacement and strain within the flexible substrate and strain within the force or strain sensor. Additionally, the respective output signals of the force or strain sensor is recorded through electrical routing within the flexible substrate.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE FIGURES

The components in the drawings are not necessarily to scale relative to each other. Like reference numerals designate corresponding parts throughout the several views. These and other features of will become more apparent in the detailed description in which reference is made to the appended drawings wherein.

DETAILED DESCRIPTION

The present disclosure can be understood more readily by reference to the following detailed description, examples, drawings, and their previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching. To this end, those skilled in the relevant art will recognize and appreciate that many changes can be made, while still obtaining beneficial results. It will also be apparent that some of the desired benefits can be obtained by selecting some of the features without utilizing other features. Accordingly, those who work in the art will recognize that many modifications and adaptations may be possible and can even be desirable in certain circumstances, and are contemplated by this disclosure. Thus, the following description is provided as illustrative of the principles and not in limitation thereof.

As used throughout, the singular forms "a," "an" and "the" include plural referents unless the context clearly dictates otherwise. Thus, for example, reference to "a force sensor" can include two or more such force sensors unless the context indicates otherwise.

The term "comprising" and variations thereof as used herein is used synonymously with the term "including" and variations thereof and are open, non-limiting terms.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Throughout the present disclosure, the terms "force sensor" and "strain sensor" may be used to describe the sensor being tested. The systems and methods disclosed can be used to test force sensors or strain sensors. In some implementations, the force or strain sensor is a microelectromechanical system ("MEMS") sensor.

Figure 1:
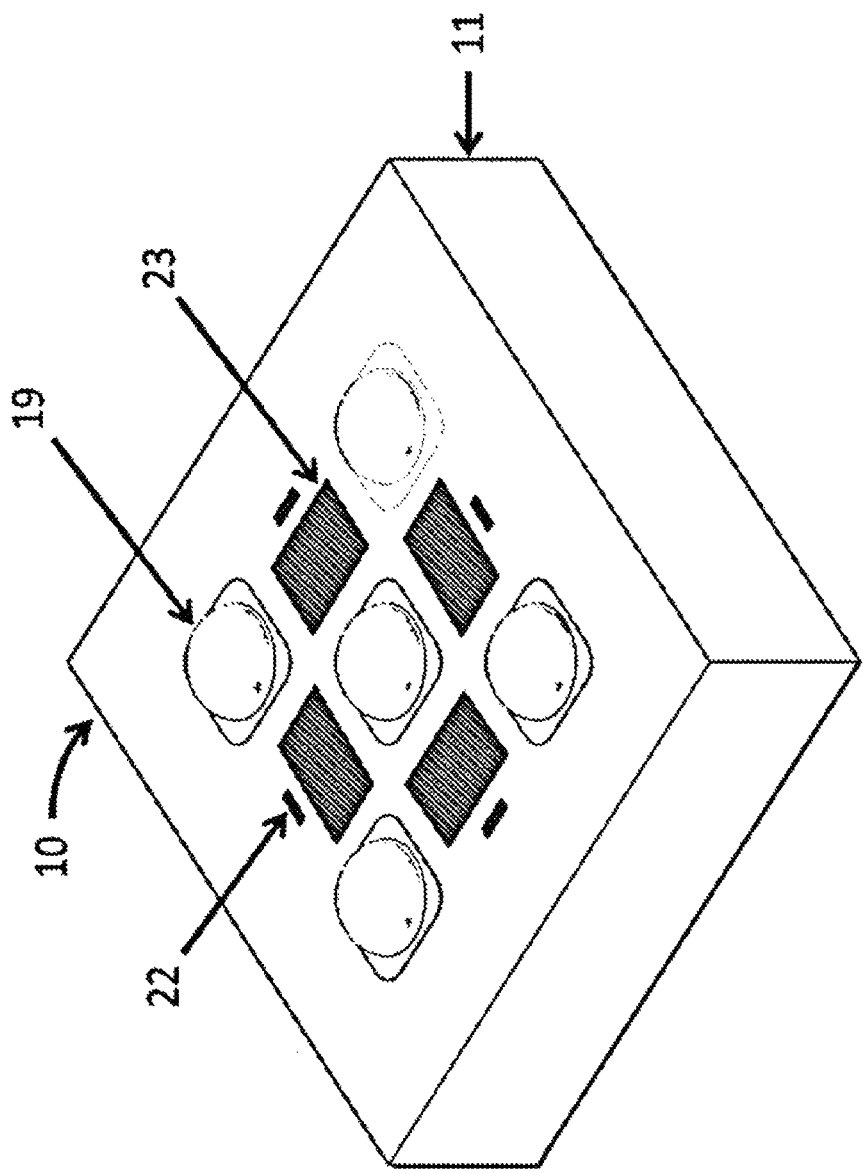
FIG. 1 is an isometric view of the top of an example force sensor.
Figure 2:
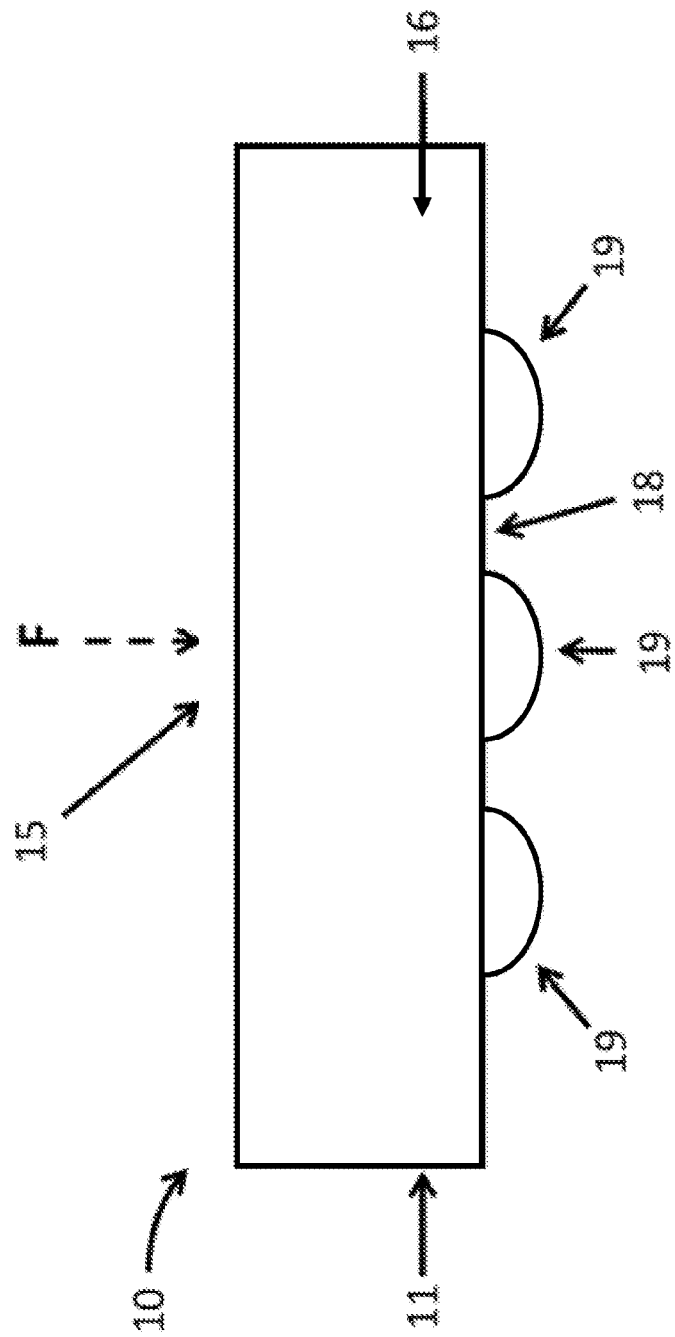
FIG. 2 is a cross-sectional view of the force sensor shown in FIG. 1.

The present disclosure relates to systems and methods for testing a force or strain sensor. In the examples below, the systems and methods are described with regard to testing a force sensor. It should be understood that force sensor testing is provided only as an example. This disclosure contemplates that the systems and methods described herein can be used to test a strain sensor (or strain gauge). With reference to FIG. 1 and FIG. 2, in some implementations the force sensor 10 includes a base 11 and electrical contacts 19. The electrical contacts 19 can be solder bumps, pillars, or other conductive contacts. It should be understood that the electrical contacts 19 provide the means for applying voltage to and/or recording voltage from the force sensor 10. A contact surface 15 exists along the top surface of the base 11 for receiving an applied force F and transmitting the force F to at least one mechanical flexure 16.

Referring again to FIGS. 1 and 2, a force sensor can include one or more diffused, deposited, or implanted sensing elements 22 on the bottom surface 18 of the base 11. The bottom surface 18 is opposite to the contact surface 15. The one or more sensing elements 22 can optionally include a piezoresistive transducer, although this disclosure contemplates using other transducer types such as piezoelectric transducers or capacitive transducers. It should be understood that the number and/or arrangement of the sensing elements 22 shown in FIGS. 1 and 2 are provided only as examples. This disclosure contemplates that a force sensor can include more, less, and/or different arrangements of sensing elements than as shown in FIGS. 1 and 2. As strain is induced in the at least one mechanical flexure 16 proportional to the force F, a localized strain is produced on the sensing element(s) 22 such that the sensing element(s) 22 experience compression or tension, depending on its specific orientation. As the sensing element 22 compresses and tenses its resistivity changes. The change in resistivity is proportional to the force F applied to the contact surface 15. To determine the force F, the resistivity can be measured and the force can be calculated using the proportional relationship between resistivity and force. The resistivity can be measured using circuits configured to measure resistivity, for example according to an implementation described herein, a Wheatstone bridge circuit 23 containing the sensing elements 22 produces a differential voltage proportional to the applied force F on the contact surface 15.

It should be understood that the force sensor 10 shown in FIGS. 1 and 2 is provided only as an example of a force sensor. This disclosure contemplates testing force sensors other than those shown in FIGS. 1 and 2. Example MEMS force sensors that can be tested using the systems and methods of this disclosure are described in detail in U.S. Pat. No. 9,487,388, issued Nov. 8, 2016 and titled "Ruggedized MEMS Force Die;" U.S. Pat. No. 9,493,342, issued Nov. 15, 2016 and titled "Wafer Level MEMS Force Dies;" U.S. Pat. No. 9,902,611, issued Feb. 27, 2018 and titled "Miniaturized and ruggedized wafer level mems force sensors;" U.S. Pat. No. 10,466,119, issued Nov. 5, 2019 and titled "Ruggedized wafer level mems force sensor with a tolerance trench;" WO2018/148503, published Aug. 16, 2018 and titled "INTEGRATED DIGITAL FORCE SENSORS AND RELATED METHODS OF MANUFACTURE," and WO2018/148510, published Aug. 16, 2018 and titled "INTEGRATED PIEZORESISTIVE AND PIEZOELECTRIC FUSION FORCE SENSOR," the disclosures of which are incorporated by reference in their entireties.

Figure 3:
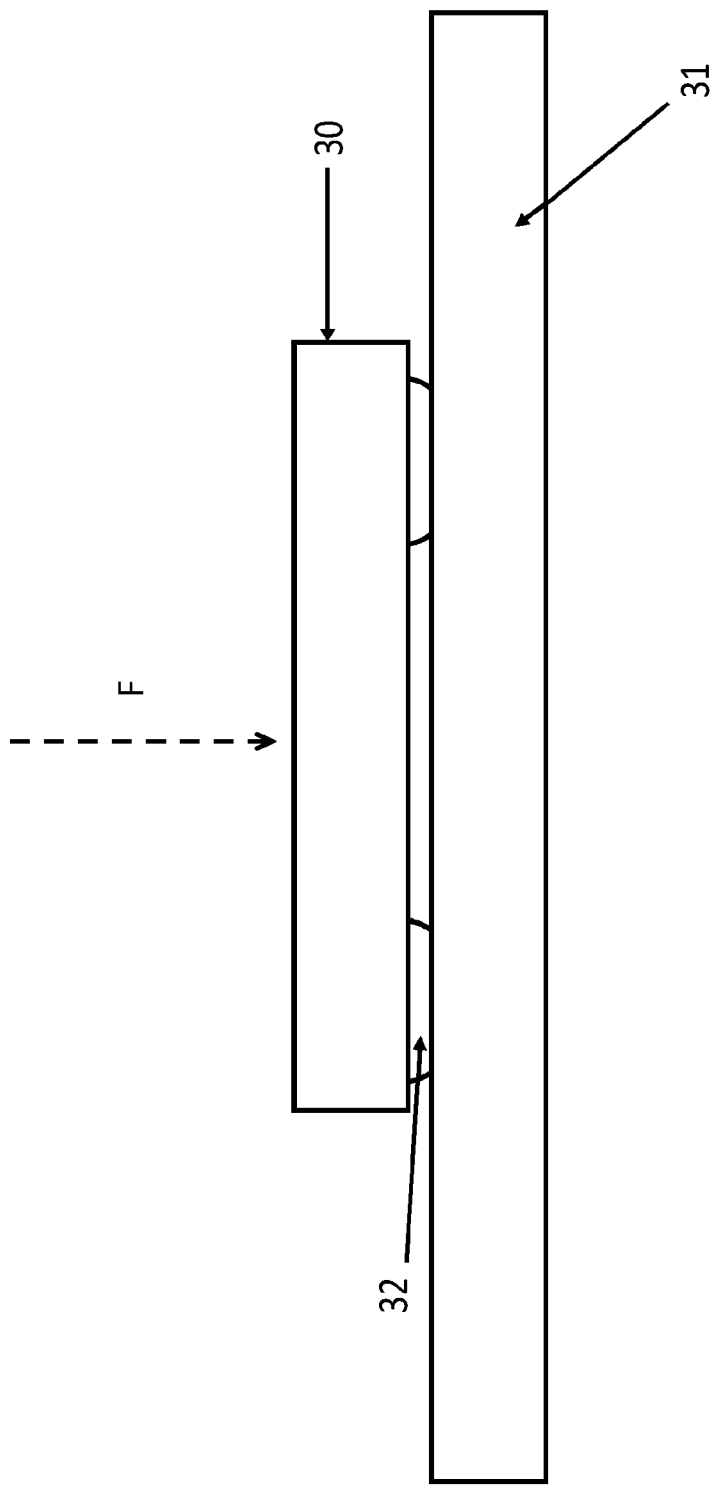
FIG. 3 shows a cross-sectional view of another example force sensor soldered to a substrate where a force is applied to the top of the force sensor.
Figure 4:
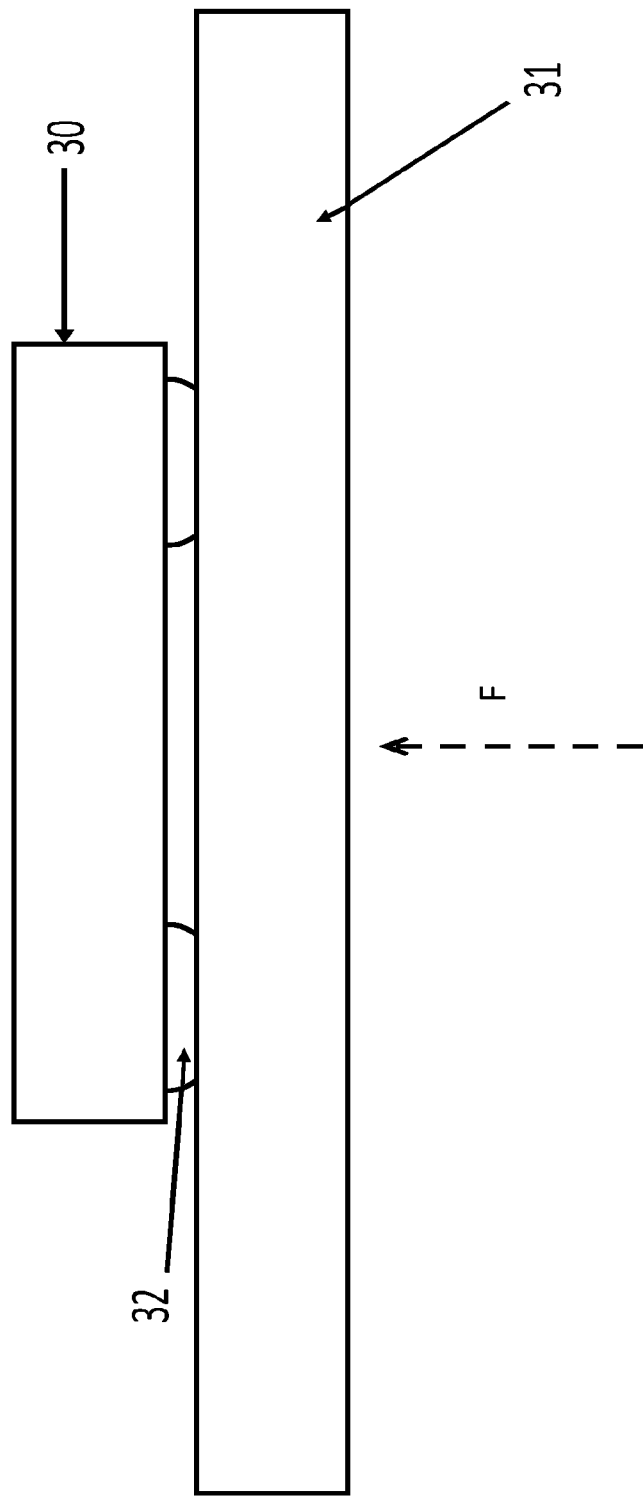
FIG. 4 shows a cross-sectional view of another example force sensor soldered to a substrate where a force is applied to the bottom of the substrate.

FIGS. 3 and 4 illustrate a force sensor 30 according to another implementation described herein. Optionally, the force sensor 30 is soldered to a substrate 31 through solder balls 32. Optionally, the substrate 31 can be a flexible substrate, and electrical routing can be positioned within the flexible substrate. This disclosure contemplates that the force sensor 30 can be any force sensor, including the MEMS force sensors described above. As shown in FIG. 3, the force sensor 30 can be activated from the top surface with force F to measure the force F and output an electrical signal proportional to the applied force. In this implementation, the substrate is optionally held fixed in place with backing material or other support material.

Referring to FIG. 4, the force sensor 30 can optionally be activated by applying a force F from the bottom surface of the substrate 31. The force F can induce a displacement and strain in the substrate 31 which in turn can impart strain to the force sensor 30 through solder balls 32. In this implementation, the substrate 31 optionally has some flexibility while the top surface of the sensor 30 is optionally unconstrained by any hard surface. The force sensor 30 can undergo strain and can output an electrical signal proportional to the amount of strain it experiences due to force F.

Figure 5:
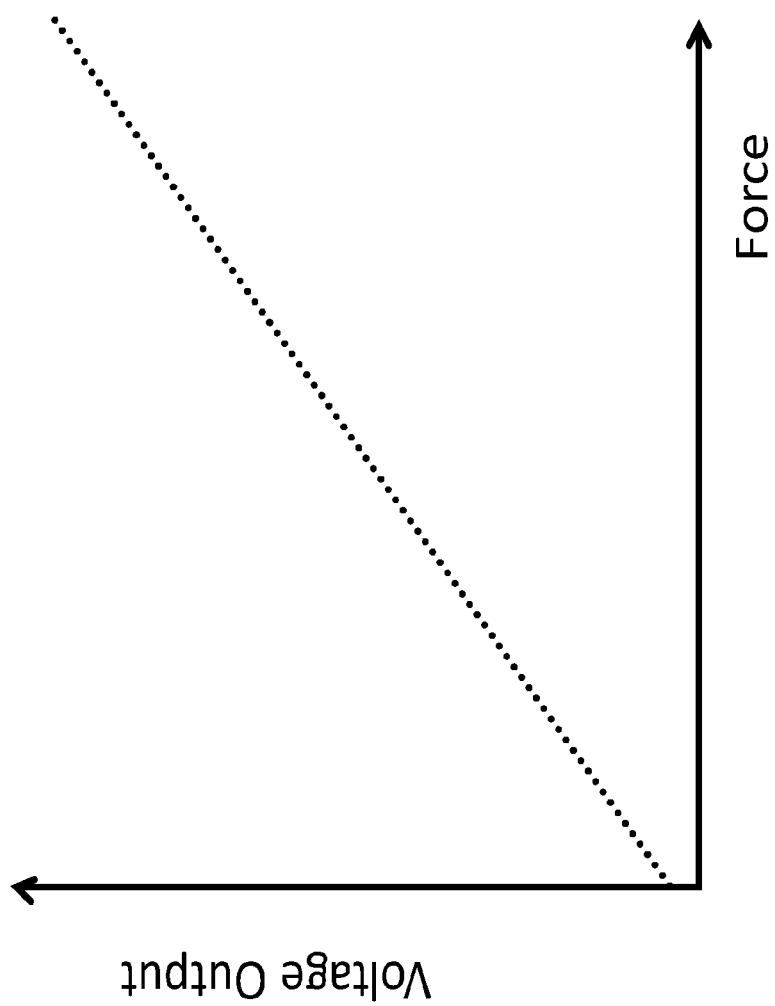
FIG. 5 shows a typical voltage output response for a force sensor with respect to input force level.

FIG. 5 illustrates a graph depicting typical output voltage signal versus input force for a force sensor, e.g., a force sensor such as one described above with regard to FIGS. 1-4. According to conventional force sensor testing, a force value is set and held constant while measuring output of the force sensor. This process is repeated at a plurality of force level increments to establish the response curve (i.e., the dotted line in FIG. 5) of the sensor. At each applied force value, the output of the force sensor is allowed to stabilize before moving to the next incremental force value. The response curve represents the voltage output (y-axis) versus applied force (x-axis). This disclosure contemplates that the force response of a force or strain sensor is monotonic, e.g., the voltage output never decreases as the values of the applied force increase. The linear force response shown in FIG. 5 is provided only as an example. It should be understood that the force response curve for a force or strain sensor may be non-linear. This conventional testing method is time consuming since changing the applied force induces electrical and mechanical noise which requires settling time or averaging to reduce noise and enable measurement accuracy.

Figure 6:
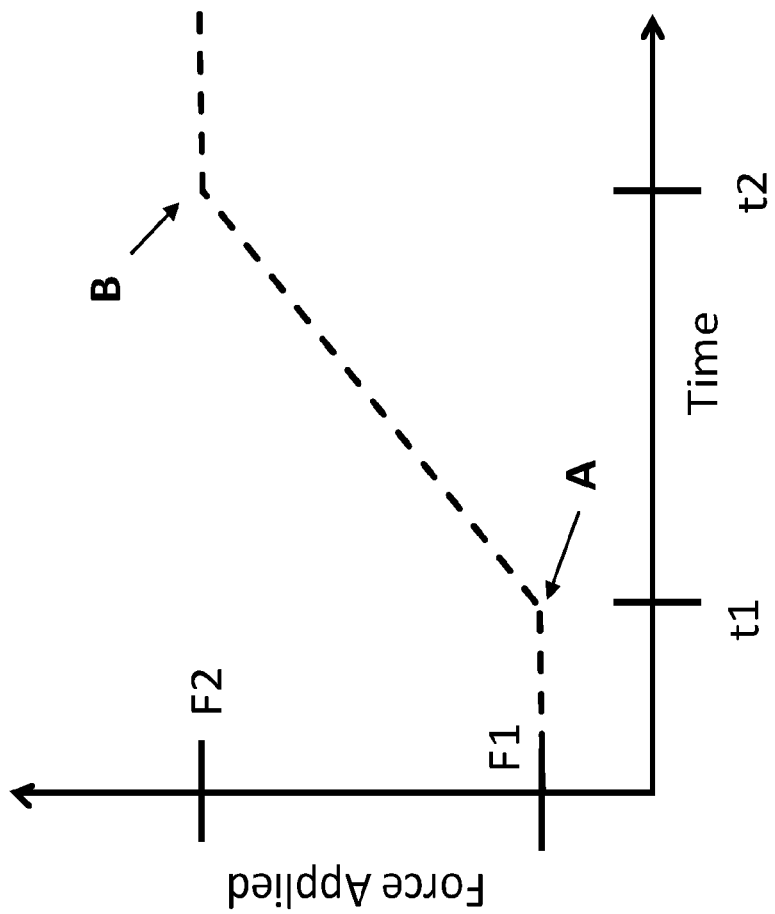
FIG. 6 shows the force applied to a force sensor versus time as measured by a load cell according to an implementation described herein.

FIG. 6 illustrates a graph of force applied to a force sensor as a function of time according to an implementation described herein. In FIG. 6, the force applied (or voltage output) is measured by the load cell. As described herein, a load cell is a transducer that converts applied force into a measurable output voltage. In other words, the voltage output of a load cell is indicative of the force applied to the load cell. The applied force is held at a fixed value F1 up to time t1. At time t1, the force begins to ramp with time, corresponding to point A in the graph. As discussed below, the force increases continuously from F1 to F2 between point A (at time t1) to point B (at time t2). In FIG. 6, the force ramps linearly (e.g., increases linearly) with time. It should be understood that the linearly increasing applied force beginning at time t1 is provided only as an example. This disclosure contemplates that the increasing applied force beginning at time t1 may do so in a non-linear fashion. Additionally, it should be understood that the rate of increase shown in FIG. 6 is provided only as an example and that other rates of increase are possible. The force is continually ramped to point B in the graph, where it is held at a fixed value F2 starting at time t2. In FIG. 6, F2 is greater than F1. It should be understood that the values of F1 and F2 and times t1 and t2, as well as the relationships therebetween, are provided only as examples. Additionally, a ramped increasing force is used in FIG. 6 as an example. It should be understood that force can be decreased, for example, between F2 and F1 over time. The x-axis in FIG. 6 represents time, and the y-axis represents the applied force. It should be understood that the y-axis in FIG. 6 represents the voltage output of a load cell, which is indicative of the applied force.

Figure 7:
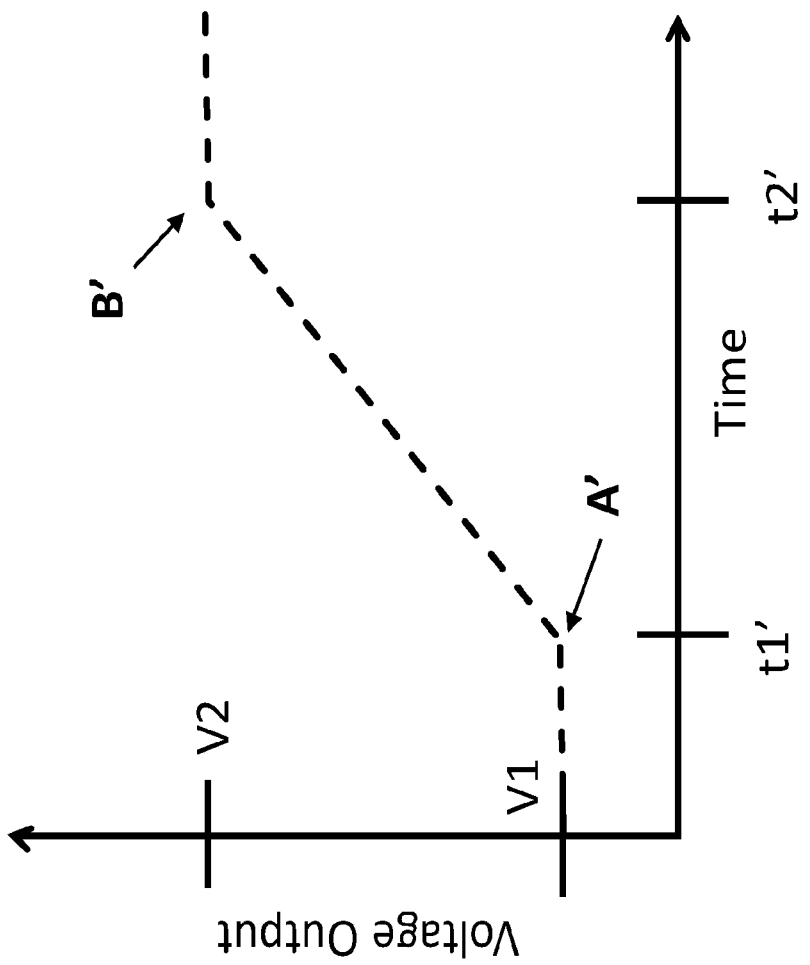
FIG. 7 shows an example voltage output signal versus time for a force sensor experiencing the force profile shown in FIG. 6.

FIG. 7 illustrates the corresponding voltage output for a linear force sensor experiencing the force profile illustrated in FIG. 6. It should be understood that the force response of a force or strain sensor is not required to be linear. The response of a force or strain sensor, whether linear or non-linear, is expected to be monotonic. The linear force response shown in FIG. 7 is provided only as an example. In FIG. 7, the voltage output is measured by the force sensor. In other words, x-axis in FIG. 7 represents time, and the y-axis in FIG. 7 represents the voltage output of the force sensor. There is a constant voltage output V1 while the applied force F1 is constant. When the applied force begins to ramp linearly at point A in FIG. 6, there is a corresponding change in the voltage output starting at point A' in FIG. 7. This occurs at time t1' in FIG. 7. It should be understood that the rate of increase shown in FIG. 7 is provided only as an example and that other rates of increase are possible. Further, a delay is present between the input force and the output voltage of the force sensor. For example, a delay can be caused by delays in the signal path and/or differences in the signal path lengths for load cell (FIG. 6) and force sensor (FIG. 7), respectively. Therefore, the time t1' in FIG. 7 is different than the time t1 in FIG. 6. Similarly, t2 in FIG. 6 is different than t2' in FIG. 7.

As the force is ramped linearly as shown in FIG. 6, the voltage output of a force sensor responds proportionally as shown between points A' and B' in FIG. 7. With reference to FIG. 7, the voltage output of the sensor increases until point B' which corresponds to a constant force level F2 being applied. This occurs at time t2' in FIG. 7. After point B', the voltage output is constant at voltage V2 corresponding to constant force F2. Again, a delay can be caused by delays in the signal path and/or differences in the signal path lengths for load cell (FIG. 6) and force sensor (FIG. 7), respectively.

Figure 8:
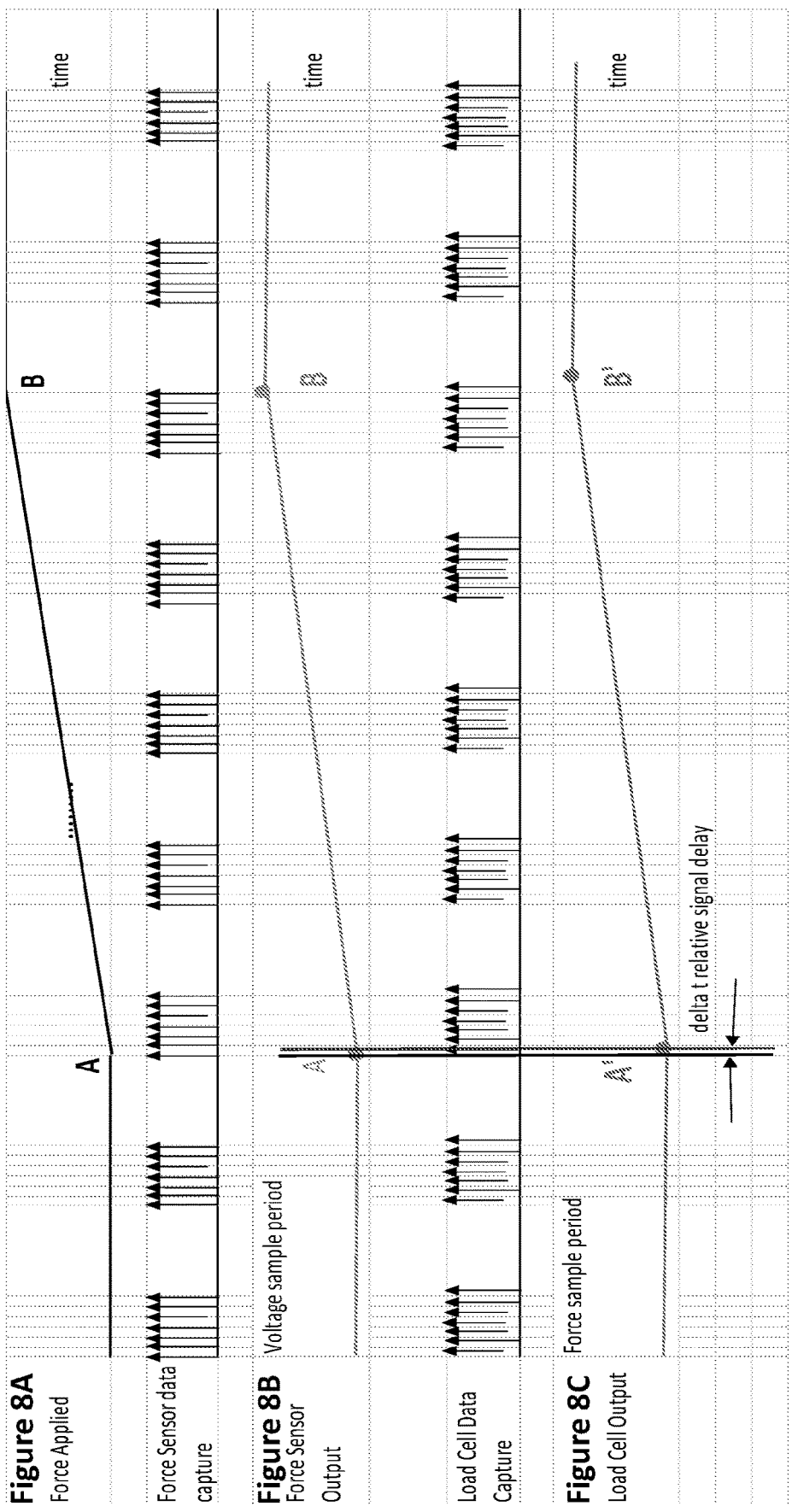
FIGS. 8A-8C show an example of the relative timing among force events applied to a force sensor (FIG. 8A) and the resulting load cell force output (FIG. 8C) and force sensor voltage output (FIG. 8B).

FIGS. 8A-8C show an example of relative timing among events and measurements according to an implementation described herein. FIG. 8A indicates the timing of an applied force to a force sensor (e.g., the force sensors of any one of FIGS. 1-4), illustrated as a linear ramp in force from point A to point B. The applied force is ramped continuously over time between points A and B (e.g., in contrast to incrementally or with discreate steps). As described above, the linearly increasing applied force and force response in FIGS. 6 and 7 are provided only as examples. As shown in FIG. 8A, the applied force is held constant at times before point A and also held constant at times after point B. Between points A and B, the applied force increases continuously from F1 to F2. FIG. 8B illustrates the timing of voltage measurements from the force sensor (also referred to herein as "force sensor output"). According to the implementation illustrated in FIGS. 8A-8C, the system is configured to sample using a "burst mode." In "burst mode," the sensor and load cell are sampled in "bursts" where each burst includes plurality of voltage measurements (e.g., from either the force sensor or the load cell) acquired in each "burst period." In FIGS. 8A-8C, the vertical arrows represent samples, and the spacing between the vertical arrows represents the sampling period. The sampling rate for both the sensor output (FIG. 8B) and load cell output (FIG. 8C) can be tuned to reduce the measurement noise of a single burst mode reading, for example, by means of averaging the plurality of voltage measurements acquired in a burst. Additionally, the burst period is not fixed, and can be adjusted to account for motor speed (e.g., driver of the mechanical actuator), sensor output sensitivity, and/or other parameters particular to a given measurement implementation. As shown in FIGS. 8A-8C, a plurality of burst measurements are acquired from each of the force sensor and load cell prior to points A and A', a plurality of burst measurements are acquired from each of the force sensor and load cell between points A/A' and B/B', and a plurality of burst measurements are acquired from each of the force sensor and load cell after points B and B'. It should be understood that a plurality of burst measurements are acquired from each of the force sensor and load cell while the applied force increases continuously between points A/A' and B/B'. In other words, according to the implementation shown in FIGS. 8A-8C, the applied force is not increased incrementally (e.g., step-wise) between points A/A' and B/B' with a pause for measurements at an incremental step. FIG. 8C illustrates the timing of measurements from a load cell (also referred to herein as "load cell output"), which quantifies the amount of force applied to the force sensor as a function of time. The load cell is also measured in a burst mode with a force sample period, and a burst period indicated by the time between groups of small vertical arrows. As discussed above, the sampling rate for the load cell output (FIG. 8C) can be tuned to reduce the measurement noise of a single burst mode reading, for example, by means of averaging the plurality of voltage measurements acquired in a burst. Additionally, the burst period is not fixed, and can be adjusted to account for motor speed (e.g., driver of the mechanical actuator), load cell output sensitivity, and/or other parameters particular to a given measurement implementation. Different combinations of force sensor, load cell, sampling mode, and sampling period are possible, according to implementations described herein. For example, the output data from the force sensor may be sampled with a first sampling frequency/period, and the output data from the load cell may be sampled with a second sampling frequency/period. According to some implementations described herein, the load cell sample period and force sensor sample period can be the same. According to other implementations, the load cell sample period and force sensor sample period can be different. Alternatively or additionally, the load cell sample frequency and force sensor sample frequency can be the same or different.

The actual timing of signal events between load cell measurements and force sensor measurements will not in general be synchronous, but will occur with some relative delay between the different signal paths, which is indicated as delta t relative signal delay below FIG. 8C. After the load cell and force sensor voltage output signals have been measured and recorded through the sequence shown in FIGS. 6 and 7 (e.g., fixed 1st force (F1) until time t1/t1', followed by ramped force until time t2/t2', followed by fixed 2nd force (F2)), the signal data can be post processed to map the events at the beginning and end of the force ramp. Points A/A' and B/B' serve as the temporal data synchronization points. For example, the onset of the load cell voltage output signal increase (e.g., at time t1 in FIG. 6) is mapped to the onset of the force sensor voltage output signal increase (e.g., at time t1' in FIG. 7), and similarly the load cell voltage output stabilization (e.g., at time t2 in FIG. 6) is mapped to the force sensor voltage output stabilization (e.g., at time t2' in FIG. 7), to obtain a function of force sensor voltage output as a function of load cell voltage output. The measurement times for one signal path can be shifted or scaled appropriately such that the start and end times for the force ramp coincide between load cell voltage output and force sensor voltage output. In some implementations, the load cell and force sensor voltage are sampled at the same rate, such that after scaling times on one variable to match the start and stop events, the intermediate points can also be scaled by the same factor to match values one to one between load cell output and sensor voltage output.

Figure 9:
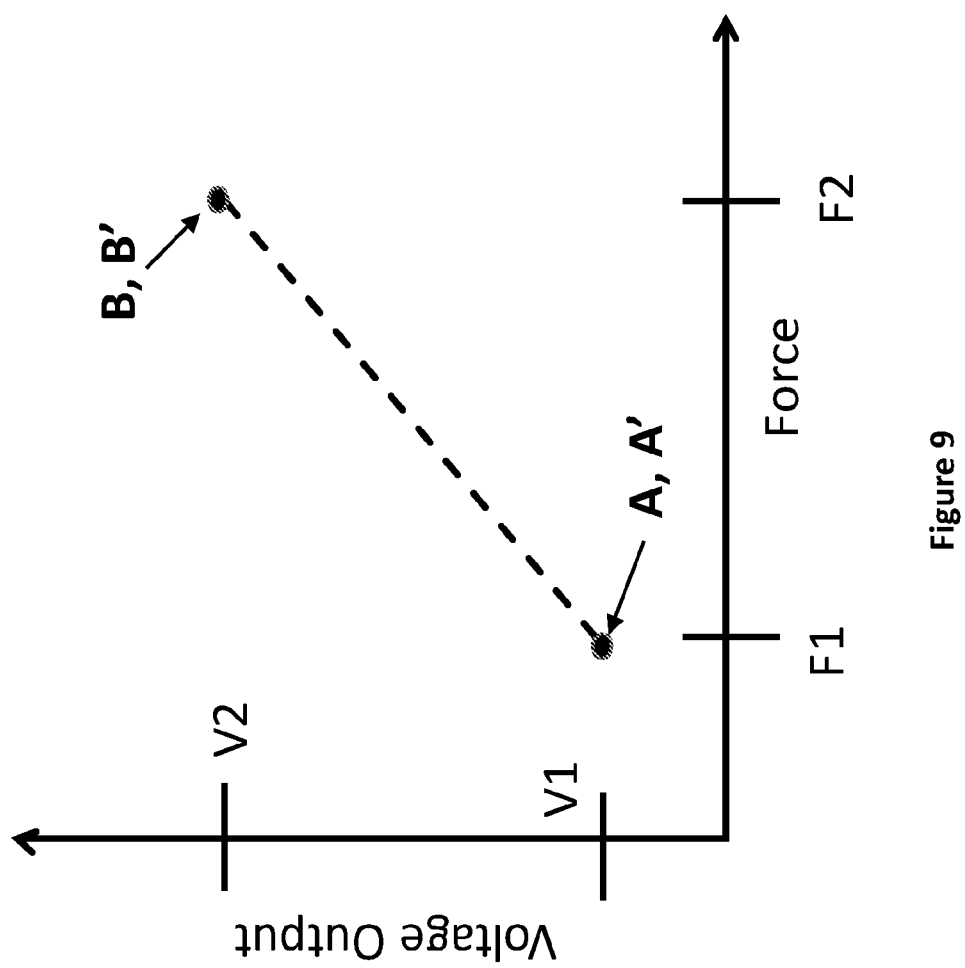
FIG. 9 shows a resulting voltage output versus force output measurement based on post processing of load cell voltage output and force sensor voltage output and the synchronization of force events (A and A'/B and B').

The transition points (e.g., points A/A' and B/B' in FIGS. 6 and 7) can be used as temporal synchronization points. It should be understood that the number and/or relationship between the synchronization points are provided only as an example. For example, by synchronizing the time at which the load cell output begins to change, with the point at which the force sensor output begins to change, the two graphs can be synchronized, accounting for any time delay between the output from the force sensor and the output from the load cell. Accordingly, the force sensor output voltage can be determined as a function of the load cell force measurement. By scaling the measurement times of one signal path, either force sensor voltage output or load cell voltage output, and mapping the start and stop force ramp events, the force sensor voltage output can be determined as a function of the load cell force measurement, providing the desired signal output versus applied force measurement as shown in FIG. 9. This can be accomplished without repeating a plurality of force level increments and measurements to establish the force sensor's response curve according to conventional techniques as discussed above with regard to FIG. 5.

Figure 10:
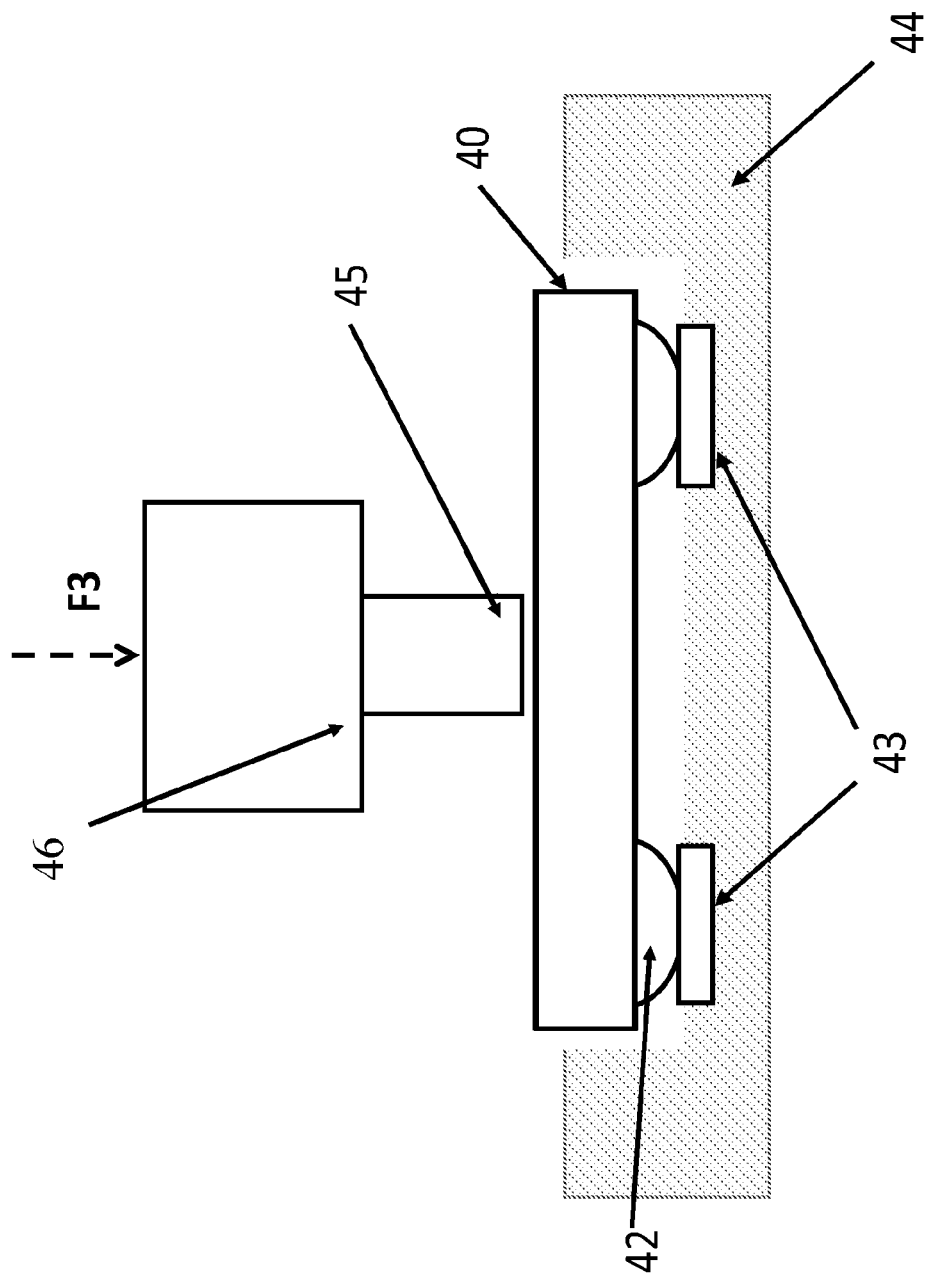
FIG. 10 shows a cross-sectional view of a system for testing a force or strain sensor according to an implementation described herein.

FIG. 10 illustrates a cross-sectional view of a system for testing a force or strain sensor. In FIG. 10, the system includes a test fixture 44, a mechanical actuator 45, and a load cell 46. The system also includes a controller (e.g., computing device 1100 shown in FIG. 11) operably coupled to the mechanical actuator 45 and the load cell 46. Additionally, the controller is operably coupled to a force sensor 40 via the test fixture 44. This disclosure contemplates that the force sensor 40 can be any one of the force sensors as described above, or another other type of force or strain sensor. The controller can be coupled to the mechanical actuator 45, load cell 46, and/or force sensor 40 through one or more communication links. This disclosure contemplates the communication links are any suitable communication link. For example, a communication link may be implemented by any medium that facilitates data exchange including, but not limited to, wired, wireless and optical links.

The test fixture 44 can be made (or coated with) of an insulating material and include one or more electrical connections 43. Optionally, as shown in FIG. 10, the electrical connections 43 are provided in a recess of the text fixture 44, where the recess is configured to fit the force sensor 40. This disclosure contemplates that insulating materials include, but are not limited to, polyether ether ketone (PEEK), ceramic, and polyimide. This disclosure also contemplates that the electrical connections 43 can be made of a conductive material (e.g. metal). The electrical connections 43 can be provided to make contact with solder balls (or pillars, terminals, etc.) 42 of the force sensor 40. It should be understood that the solder balls 42 provide the means for applying voltage to and/or recording response (e.g., voltage output) from the force sensor 40. The number, size, shape and/or arrangement of the electrical connections 43 can be chosen based on the design of the force sensor 40. It should be understood that the number, size, shape and/or arrangement of the electrical connections 43 in FIG. 10 are provided only as examples. The test fixture 44 therefore serves as an electrically insulating mechanical fixture with conductive electrical connections 43 for providing source voltage and/or measuring output voltage of the force sensor 40. The force sensor 40 can be operably coupled to the controller (e.g., computing device 1100 shown in FIG. 11) via the electrical connections 43. Accordingly, the system is configured to record the force sensor output voltage (e.g., as shown in FIGS. 7 and 8B) via the electrical connections 43 while a force is applied to the force sensor 40.

The system also includes the mechanical actuator 45. The mechanical actuator 45 is configured to apply the force to the force sensor 40. For example, the mechanical actuator 45 can be a moveable rigid body. The mechanical actuator 43 can be made of a hard plastic (e.g., an acetal homopolymer such as DELRIN), metal (e.g. aluminum, stainless steel, etc.), or an elastic material (e.g., silicone rubber). This disclosure contemplates the mechanical actuator's size and/or shape are variable. For example, the mechanical actuator 45 can have a flat surface and/or rounded protrusions. Alternatively or additionally, the mechanical actuator 45 can be larger or smaller than the size of the force sensor 40. Optionally, the mechanical actuator 45 is about the same size as the force sensor 40. The mechanical actuator 45 can be controlled to make contact with a surface of the force sensor 40 and apply a force F3, which can be variable over time as described herein. Mechanical movement can be controlled by means of one or more electrical motors, such as a stepper or servo motor, for example. In some implementations, the system optionally includes a robotic arm, and the mechanical actuator 45 is operably coupled to the robotic arm. For example, the mechanical actuator 45 can be attached to the robotic end effector. The robotic arm can be configured to control the movements (e.g., trajectory, position, orientation, etc.) of the mechanical actuator 45 relative to the test fixture 44 such that a variable force can be applied by the mechanical actuator 45 to the force sensor 40, as described above, mechanical movement can be controlled by means of one or more electrical motors. Robotic product testing systems are known in the art and are therefore not described in further detail herein.

Additionally, the system includes the load cell 46. A load cell is a transducer that converts force into a measurable electrical output (e.g., a voltage). A strain gauge is one example type of load cell. It should be understood that other types of load cells can be used in the system described herein. Load cells are known in the art and are therefore not described in further detail herein. The load cell 46 can be arranged in series with the mechanical actuator 45. The force F3 applied by the mechanical actuator 45 can be measured by a load cell 46. Optionally, the load cell 46 can be attached directly or indirectly to the mechanical actuator 45. Optionally, the load cell 46 is not attached to the mechanical actuator 45. It should be understood that the arrangement of the load cell 46 in FIG. 10 is provided only as an example.

As described herein, applied force F3 in FIG. 10 can be variable over time. For example, the mechanical actuator 45 can be controlled to apply a first force (e.g., constant force F1 in FIG. 6) while simultaneously recording the respective output signals from the force sensor 40 (e.g., FIG. 7 prior to time t1') and the load cell 46 (e.g., FIG. 6 prior to time t1). The mechanical actuator 45 can be further controlled to subsequently ramp the first force to a second force (e.g., force F2 in FIG. 6) while simultaneously recording the respective output signals from the force sensor 40 (e.g., FIG. 7 between times t1' and t2') and the load cell 46 (e.g., FIG. 6 between times t1 and t2). The mechanical actuator 45 can be further controlled to subsequently apply the second force (e.g., constant force F2 in FIG. 6) while simultaneously recording the respective output signals from the force sensor 40 (e.g., FIG. 7 after to time t2') and the load cell 46 (e.g., FIG. 6 after to time t2). Additionally, the transition from the first force to the ramped force (e.g., at time t1 in FIG. 6/t1' in FIG. 7) and the transition from the ramped force to the second force (e.g., at time t2 in FIG. 6/t2' in FIG. 7) serve as temporal data synchronization points between the respective output signals from the force sensor 40 and the load cell 46. These synchronization points allow the force sensor output voltage to be determined as a function of load cell force measurement. This relationship between force sensor output voltage and applied force is shown, for example, by FIG. 9.

It should be appreciated that the logical operations described herein with respect to the various figures may be implemented (1) as a sequence of computer implemented acts or program modules (i.e., software) running on a computing device (e.g., the computing device described in FIG. 11), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 11:
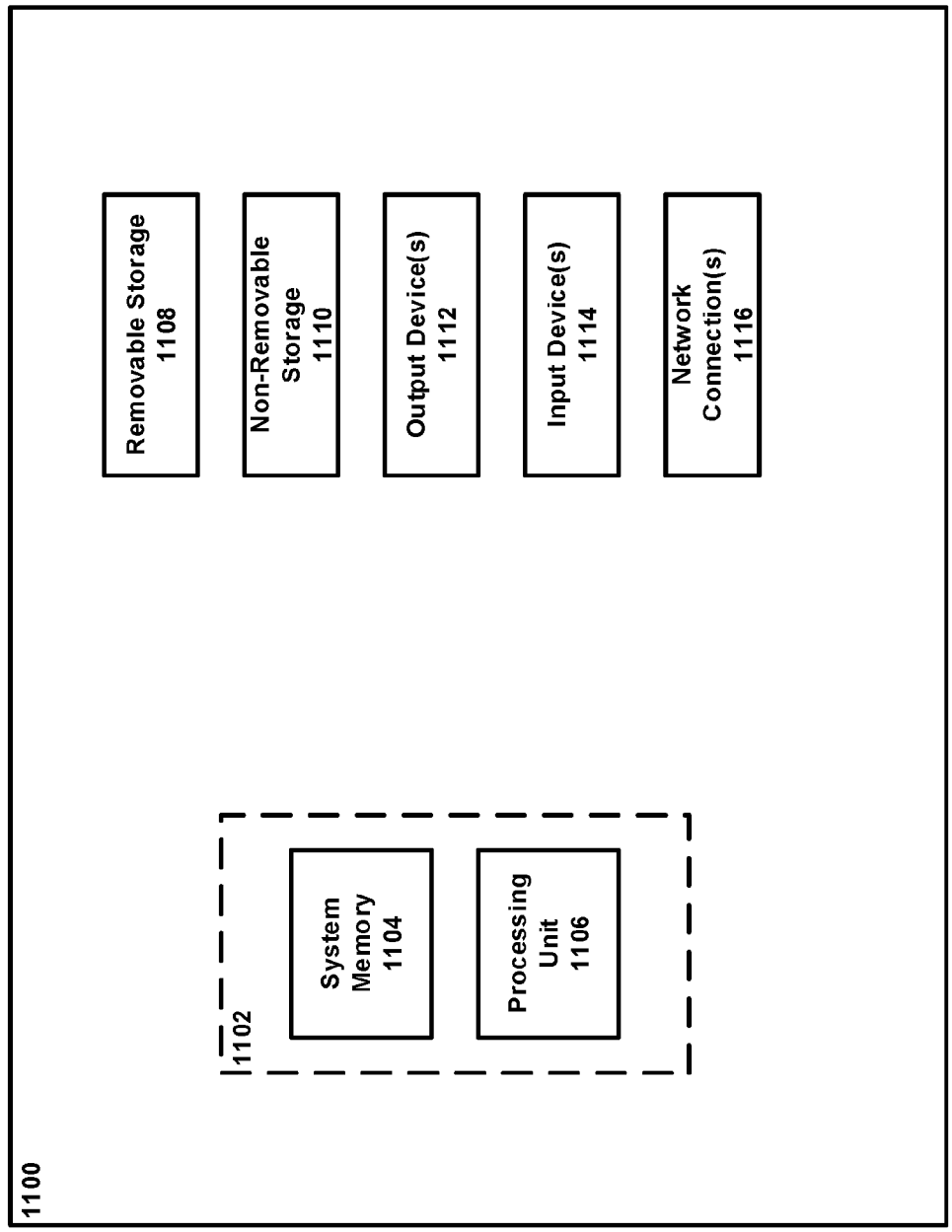
FIG. 11 is a block diagram of an example computing device.

Referring to FIG. 11, an example computing device 1100 upon which the methods described herein may be implemented is illustrated. The computing device 1100 can be operably coupled to the mechanical actuator and load cell described above, for example, and be configured to control application of the force and record output data (e.g., output signals) from the load cell. Additionally, the computing device 1100 can be operably coupled to the force sensor described above, for example, and be configured to record output data (e.g., output signals) from the force or strain sensor. It should be understood that the example computing device 1100 is only one example of a suitable computing environment upon which the methods described herein may be implemented. Optionally, the computing device 1100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 1100 typically includes at least one processing unit 1106 and system memory 1104. Depending on the exact configuration and type of computing device, system memory 1104 may be volatile (such as random access memory (RAM)), non-volatile (such as read-only memory (ROM), flash memory, etc.), or some combination of the two. This most basic configuration is illustrated in FIG. 11 by dashed line 1102. The processing unit 1106 may be a standard programmable processor that performs arithmetic and logic operations necessary for operation of the computing device 1100. The computing device 1100 may also include a bus or other communication mechanism for communicating information among various components of the computing device 1100.

Computing device 1100 may have additional features/functionality. For example, computing device 1100 may include additional storage such as removable storage 1108 and non-removable storage 1110 including, but not limited to, magnetic or optical disks or tapes. Computing device 1100 may also contain network connection(s) 1116 that allow the device to communicate with other devices. Computing device 1100 may also have input device(s) 1114 such as a keyboard, mouse, touch screen, etc. Output device(s) 1112 such as a display, speakers, printer, etc. may also be included. The additional devices may be connected to the bus in order to facilitate communication of data among the components of the computing device 1100. All these devices are well known in the art and need not be discussed at length here.

The processing unit 1106 may be configured to execute program code encoded in tangible, computer-readable media. Tangible, computer-readable media refers to any media that is capable of providing data that causes the computing device 1100 (i.e., a machine) to operate in a particular fashion. Various computer-readable media may be utilized to provide instructions to the processing unit 1106 for execution. Example tangible, computer-readable media may include, but is not limited to, volatile media, non-volatile media, removable media and non-removable media implemented in any method or technology for storage of information such as computer readable instructions, data structures, program modules or other data. System memory 1104, removable storage 1108, and non-removable storage 1110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1106 may execute program code stored in the system memory 1104. For example, the bus may carry data to the system memory 1104, from which the processing unit 1106 receives and executes instructions. The data received by the system memory 1104 may optionally be stored on the removable storage 1108 or the non-removable storage 1110 before or after execution by the processing unit 1106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A testing system, comprising:
   a test fixture configured to provide electrical connection to a force or strain sensor;
   a mechanical actuator configured to apply a force to the force or strain sensor;
   a load cell configured to measure an amount of the force applied to the force or strain sensor;
   a controller configured to operate the mechanical actuator and simultaneously record respective output signals from the force or strain sensor and the load cell; and
   a flexible substrate, wherein the force or strain sensor is soldered to the flexible substrate, and the force is applied to the flexible substrate by the mechanical actuator to create displacement and strain within the flexible substrate and strain within the force or strain sensor.

2. The system of claim 1, wherein simultaneously recording the respective output signals from the force or strain sensor and the load cell comprises sampling the respective output signals in a burst mode, wherein the burst mode is defined by a sampling frequency and a sampling period.

3. The system of claim 2, wherein the respective output signal from the force or strain sensor is sampled with a first sampling frequency and a first sampling period.

4. The system of claim 3, wherein the respective output signal from the load cell is sampled with a second sampling frequency and a second sampling period.

5. The system of claim 4, wherein the first and second sampling frequencies are the same.

6. The system of claim 4, wherein the first and second sampling frequencies are different.

7. The system of claim 1, wherein the force or strain sensor comprises one or more piezoresistive, piezoelectric, or capacitive transducers.

8. The system of claim 1, further comprising a robotic arm, wherein the mechanical actuator is controlled by the robotic arm.

9. The system of claim 8, wherein the robotic arm is operably connected to and controlled by the controller.

10. The system of claim 1, wherein the respective output signals recorded by the controller are stored in memory of the controller.

11. The system of claim 1, wherein the respective output signals from the force or strain sensor and the load cell are recorded as a function of time.

12. The system of claim 1, wherein the controller is configured to operate the mechanical actuator to continuously change the amount of the force applied by the mechanical actuator from a first force value to a second force value, wherein the first and second force values are different.

13. The system of claim 12, wherein the controller is further configured to:
   hold the first force value constant while recording the respective output signals from the force or strain sensor and the load cell as a function of time;
   subsequently ramp the first force value to the second force value while recording the respective output signals from the force or strain sensor and the load cell as the function of time; and
   hold the second force value constant while recording the respective output signals from the force or strain sensor and the load cell as the function of time.

14. The system of 13, wherein the controller is further configured to use a transition from the first force value to a ramped force and a transition from the ramped force to the second force value as temporal data synchronization points between the respective output signals from the force or strain sensor and the load cell.

15. The system of claim 1, wherein the respective output signal of the force or strain sensor is recorded by the controller through electrical routing within the flexible substrate.

16. The system of claim 1, wherein the system comprises the force or strain sensor.

17. A method for testing a force or strain sensor, comprising:
   providing a test fixture configured to provide electrical connection to the force or strain sensor;
   connecting the force or strain sensor to the test fixture;
   operating a mechanical actuator to apply a force to the force or strain sensor;
   providing a load cell configured to measure an amount of the force applied to the force or strain sensor;
   simultaneously recording respective output signals from the force or strain sensor and the load cell; and
   wherein the force or strain sensor is soldered to a flexible substrate, and the force is applied to the flexible substrate by the mechanical actuator to create displacement and strain within the flexible substrate and strain within the force or strain sensor.

18. The method of claim 17, wherein simultaneously recording the respective output signals from the force or strain sensor and the load cell comprises sampling the respective output signals in a burst mode, wherein the burst mode is defined by a sampling frequency and a sampling period.

19. The method of claim 18, wherein the respective output signal from the force or strain sensor is sampled with a first sampling frequency and a first sampling period.

20. The method of claim 19, wherein the respective output signal from the load cell is sampled with a second sampling frequency and a second sampling period.

21. The method of claim 20, wherein the first and second sampling frequencies are the same.

22. The method of claim 20, wherein the first and second sampling frequencies are different.

23. The method of claim 17, wherein the force or strain sensor detects the strain through piezoresistive, piezoelectric, or capacitive transducers.

24. The method of claim 17, wherein the mechanical actuator is controlled by a robotic arm.

25. The method of claim 24, wherein the robotic arm is operably connected to and controlled by a computing device.

26. The method of claim 17, wherein the respective output signals from the force or strain sensor and the load cell are stored in memory of a computing device.

27. The method of claim 17, wherein the respective output signals from the force or strain sensor and the load cell are recorded as a function of time.

28. The method of claim 17, further comprising continuously changing the amount of the force applied by the mechanical actuator from a first force value to a second force value, wherein the first and second force values are different.

29. The method of claim 28, further comprising:
holding the first force value constant while recording the respective output signals from the force or strain sensor and the load cell as a function of time;
subsequently ramping the first force value to the second force value while recording the respective output signals from the force or strain sensor and the load cell as the function of time; and
holding the second force value constant while recording the respective output signals from the force or strain sensor and the load cell as the function of time.

30. The method of 29, further comprising using a transition from the first force value to a ramped force and a transition from the ramped force to the second force value as temporal data synchronization points between the respective output signals from the force or strain sensor and the load cell.

31. The method of claim 17, wherein the respective output signal of the force or strain sensor is recorded through electrical routing within the flexible substrate.

* * * * *